US011975481B2

(12) United States Patent
Bauza et al.

(10) Patent No.: US 11,975,481 B2
(45) Date of Patent: May 7, 2024

(54) ADAPTIVE CLOSED-LOOP CONTROL OF ADDITIVE MANUFACTURING FOR PRODUCING A WORKPIECE

(71) Applicant: Carl Zeiss Industrielle Messtechnik GmbH, Oberkochen (DE)

(72) Inventors: Marcin B. Bauza, Plymouth, MN (US); Diana Spengler, Aalen (DE); Christoph Hilmar Graf Vom Hagen, Oakland, CA (US); Claus Hermannstaedter, Goeppingen (DE); Michael Totzeck, Schwaebisch Gmuend (DE); Robert Zarnetta, Jena (DE); Markus Birkhold, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 196 days.

(21) Appl. No.: 17/078,604

(22) Filed: Oct. 23, 2020

(65) Prior Publication Data
US 2021/0107215 A1 Apr. 15, 2021

Related U.S. Application Data

(63) Continuation of application No. PCT/EP2019/060360, filed on Apr. 23, 2019.
(Continued)

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 10/85* (2021.01); *B29C 64/188* (2017.08);
(Continued)

(58) Field of Classification Search
None
See application file for complete search history.

(56) References Cited

U.S. PATENT DOCUMENTS

| 936,995 A | 10/1909 | Gillies |
| 5,352,310 A | 10/1994 | Natter |

(Continued)

FOREIGN PATENT DOCUMENTS

| CN | 101918198 A | * | 12/2010 | ............. B29C 64/00 |
| CN | 103978307 A | * | 8/2014 | ......... B23K 26/0608 |

(Continued)

OTHER PUBLICATIONS

DE-10112591-A1 translation (Year: 2022).*
(Continued)

*Primary Examiner* — Francisco W Tschen
*Assistant Examiner* — Guy F Mongelli
(74) *Attorney, Agent, or Firm* — Miller Johnson (57) ABSTRACT

A method and an arrangement for producing a workpiece using additive manufacturing techniques involve pre-process, in-process and post-process measurement in order to determine individual characteristics of one or more workpiece layers. In particular, dimensional and/or geometrical characteristics of a workpiece layer are measured before the next workpiece layer is produced. Advantageously, production parameters are controlled in response to individual material characteristics determined prior to the production process. Also advantageously, measurement results are fed back into a production process in order to increase accuracy, reliability, repeatability and precision of the production process.

20 Claims, 5 Drawing Sheets

Related U.S. Application Data (60) Provisional application No. 62/661,616, filed on Apr. 23, 2018, provisional application No. 62/661,614, filed on Apr. 23, 2018.

(51) Int. Cl.
| | |
|---|---|
| *B22F 10/85* | (2021.01) |
| *B29C 64/188* | (2017.01) |
| *B29C 64/227* | (2017.01) |
| *B29C 64/245* | (2017.01) |
| *B29C 64/268* | (2017.01) |
| *B29C 64/393* | (2017.01) |
| *B29K 25/00* | (2006.01) |
| *B29K 71/00* | (2006.01) |
| *B29K 75/00* | (2006.01) |
| *B29K 77/00* | (2006.01) |
| *B29K 103/06* | (2006.01) |
| *B33Y 10/00* | (2015.01) |
| *B33Y 40/20* | (2020.01) |
| *B33Y 50/02* | (2015.01) |
| *B33Y 70/00* | (2020.01) |

(52) U.S. Cl.
CPC .......... *B29C 64/227* (2017.08); *B29C 64/245* (2017.08); *B29C 64/268* (2017.08); *B29C 64/393* (2017.08); *B33Y 50/02* (2014.12); *B29K 2025/06* (2013.01); *B29K 2071/00* (2013.01); *B29K 2075/00* (2013.01); *B29K 2077/00* (2013.01); *B29K 2103/06* (2013.01); *B33Y 10/00* (2014.12); *B33Y 40/20* (2020.01); *B33Y 70/00* (2014.12)

(56) References Cited

U.S. PATENT DOCUMENTS

| | | | |
|---|---|---|---|
| 6,129,884 A * | 10/2000 | Beers | B33Y 30/00 |
| | | | 372/12 |
| 6,309,809 B1 | 10/2001 | Starikov et al. | |
| 6,483,596 B1 | 11/2002 | Philippi et al. | |
| 6,930,278 B1 | 8/2005 | Chung et al. | |
| 7,043,330 B2 | 5/2006 | Toyserkani et al. | |
| 7,278,315 B1 | 10/2007 | Klein et al. | |
| 7,625,198 B2 | 12/2009 | Lipson et al. | |
| 7,628,198 B2 | 12/2009 | Ouyang | |
| 7,939,003 B2 | 5/2011 | Bonassar et al. | |
| 8,226,395 B2 | 7/2012 | Pax et al. | |
| 8,414,280 B2 | 4/2013 | Pettis | |
| 8,514,389 B2 | 8/2013 | Aoki | |
| 8,636,938 B2 | 1/2014 | Bonassar et al. | |
| 8,666,142 B2 | 3/2014 | Shkolnik et al. | |
| 8,778,252 B2 | 7/2014 | Mackie et al. | |
| 8,804,102 B2 | 8/2014 | Green | |
| 8,877,112 B2 | 11/2014 | Bonassar et al. | |
| 8,888,480 B2 | 11/2014 | Yoo et al. | |
| 9,205,690 B2 | 12/2015 | Leavitt et al. | |
| 9,242,031 B2 | 1/2016 | Bonassar et al. | |
| 9,364,995 B2 | 6/2016 | Roberts, IV et al. | |
| 9,527,272 B2 | 12/2016 | Steele | |
| 9,723,866 B2 | 8/2017 | Lipson et al. | |
| 10,220,566 B2 | 3/2019 | Bauza et al. | |
| 10,532,513 B2 | 1/2020 | Bauza et al. | |
| 2002/0149137 A1 | 10/2002 | Jang et al. | |
| 2002/0195747 A1 | 12/2002 | Hull et al. | |
| 2003/0059334 A1 | 3/2003 | Shen et al. | |
| 2003/0205849 A1 | 11/2003 | Farnworth | |
| 2004/0060639 A1 * | 4/2004 | White | B33Y 50/02 |
| | | | 156/64 |
| 2004/0251581 A1 | 12/2004 | Jang et al. | |
| 2005/0248065 A1 | 11/2005 | Owada | |
| 2005/0280185 A1 | 12/2005 | Russell et al. | |
| 2007/0228592 A1 | 10/2007 | Dunn et al. | |
| 2009/0024243 A1 | 1/2009 | Suh | |
| 2009/0152771 A1 | 6/2009 | Philippi et al. | |
| 2009/0248355 A1 | 10/2009 | Kriegmair | |
| 2010/0125356 A1 | 5/2010 | Shkolnik et al. | |
| 2010/0266438 A1 * | 10/2010 | Gensert | B23P 15/24 |
| | | | 419/28 |
| 2011/0061591 A1 | 3/2011 | Stecker | |
| 2011/0130854 A1 | 6/2011 | Lettenbauer et al. | |
| 2012/0213659 A1 * | 8/2012 | Bayer | B22F 10/20 |
| | | | 264/109 |
| 2013/0015596 A1 | 1/2013 | Mozeika et al. | |
| 2013/0078821 A1 | 3/2013 | Furutono | |
| 2013/0168902 A1 | 7/2013 | Herzog et al. | |
| 2013/0178952 A1 | 7/2013 | Wersborg et al. | |
| 2013/0189435 A1 | 7/2013 | Mackie et al. | |
| 2013/0280074 A1 * | 10/2013 | Propheter-Hinckley | |
| | | | B22F 10/28 |
| | | | 416/204 R |
| 2014/0065194 A1 | 3/2014 | Yoo et al. | |
| 2014/0107823 A1 | 4/2014 | Huang | |
| 2014/0117575 A1 | 5/2014 | Kemperle et al. | |
| 2014/0265049 A1 * | 9/2014 | Burris | B22F 12/38 |
| | | | 264/497 |
| 2014/0271961 A1 | 9/2014 | Khoshnevis | |
| 2015/0045928 A1 | 2/2015 | Perez et al. | |
| 2015/0061170 A1 | 3/2015 | Engel et al. | |
| 2015/0140147 A1 | 5/2015 | Konstantinos et al. | |
| 2015/0165681 A1 | 6/2015 | Fish et al. | |
| 2015/0174828 A1 | 6/2015 | Creuzer et al. | |
| 2015/0352872 A1 | 12/2015 | Conrow et al. | |
| 2015/0375456 A1 | 12/2015 | Cheverton et al. | |
| 2016/0095959 A1 | 4/2016 | Bonassar et al. | |
| 2016/0151840 A1 * | 6/2016 | McCoy | B29C 64/205 |
| | | | 425/78 |
| 2016/0193696 A1 | 7/2016 | McFarland et al. | |
| 2016/0193790 A1 | 7/2016 | Shuck et al. | |
| 2016/0236414 A1 | 8/2016 | Reese et al. | |
| 2016/0325541 A1 | 11/2016 | Lavrentyev et al. | |
| 2016/0339643 A1 | 11/2016 | Dikovsky et al. | |
| 2016/0349215 A1 * | 12/2016 | Todorov | B29C 64/386 |
| 2017/0100894 A1 * | 4/2017 | Burns | B29C 64/386 |
| 2017/0133252 A1 | 5/2017 | Fung et al. | |
| 2017/0234676 A1 | 8/2017 | Haverkamp et al. | |
| 2017/0241769 A1 | 8/2017 | Seitz et al. | |
| 2017/0274599 A1 | 9/2017 | Kitamura et al. | |
| 2017/0295303 A1 | 10/2017 | Costa | |
| 2017/0316568 A1 | 11/2017 | Seitz et al. | |
| 2018/0018778 A1 | 1/2018 | Haverkamp et al. | |
| 2018/0035011 A1 | 2/2018 | Share et al. | |
| 2018/0036964 A1 | 2/2018 | DehghanNiri et al. | |
| 2018/0050493 A1 | 2/2018 | Sanz Ananos et al. | |
| 2018/0066933 A1 | 3/2018 | Seitz et al. | |
| 2018/0096485 A1 | 4/2018 | Held | |
| 2018/0104742 A1 | 4/2018 | Kottilingam et al. | |
| 2018/0126670 A1 | 5/2018 | DehghanNiri et al. | |
| 2018/0183166 A1 | 6/2018 | Mukuno et al. | |
| 2018/0194075 A1 * | 7/2018 | Hardee | B33Y 30/00 |
| 2018/0200957 A1 | 7/2018 | Kruger et al. | |
| 2018/0333911 A1 | 11/2018 | Lin et al. | |
| 2019/0001575 A1 | 1/2019 | Lopez et al. | |
| 2019/0039287 A1 | 2/2019 | Amaya et al. | |
| 2019/0099956 A1 | 4/2019 | Wuest et al. | |
| 2019/0126607 A1 | 5/2019 | De Pena et al. | |
| 2019/0160755 A1 | 5/2019 | Blasco et al. | |
| 2019/0177676 A1 | 6/2019 | Chow | |
| 2019/0184631 A1 | 6/2019 | Bauza et al. | |
| 2019/0299527 A1 | 10/2019 | Kitamura et al. | |
| 2019/0308245 A1 * | 10/2019 | Barnes | B23B 5/00 |
| 2019/0344500 A1 | 11/2019 | Cote | |
| 2020/0009654 A1 | 1/2020 | Brzezinski et al. | |
| 2020/0024389 A1 | 1/2020 | Gardet | |
| 2020/0055255 A1 | 2/2020 | Ota et al. | |
| 2020/0147872 A1 | 5/2020 | Bauza et al. | |
| 2020/0180023 A1 | 6/2020 | Narita et al. | |

(56) References Cited

U.S. PATENT DOCUMENTS

| | | | |
|---|---|---|---|
| 2020/0269345 A1 | | 8/2020 | Yamada et al. |
| 2021/0016509 A1* | | 1/2021 | Vora ..................... B29C 64/393 |

FOREIGN PATENT DOCUMENTS

| | | | | |
|---|---|---|---|---|
| CN | 107914013 A | * | 4/2018 | |
| DE | 10112591 A1 | * | 10/2001 | ............... B22C 9/00 |
| DE | 10314461 A1 | | 11/2003 | |
| DE | 101 01 057 B4 | | 1/2004 | |
| DE | 102008016026 A1 | | 10/2009 | |
| DE | 102008034117 A1 | | 2/2010 | |
| EP | 1 815 936 B1 | | 11/2009 | |
| EP | 2313867 B1 | | 11/2011 | |
| JP | 2016524555 A | * | 8/2016 | |
| WO | WO-2018064349 A1 | | 4/2018 | |
| WO | WO-2019206903 A1 | | 10/2019 | |

OTHER PUBLICATIONS

CN-101918198-A (Year: 2022).*
DE 10112591 translation (Year: 2023).*
CN103978307 Translation.*
CN107914013 Translation.*
U.S. Appl. No. 16/740,422, filed Jan. 11, 2020, Marcin B. Bauza.
Trumpf Laser-und Systemtechnik GmbH: Building shapes out of powder and wire; 9pgs.
Econolyst taking a closer look: Direct Rapid Manufacturing of Metallic Parts; 2008; 10pgs.
Sarah K. Everton et al.: Review of in-situ process monitoring and in-situ metrology for metal additive manufacturing; Materials and Design 95 (2016) p. 431-445, Published by Elsevier Ltd.; https://www.sciencedirect.com/science/article/pii/S0264127516300995; 15pgs.
Scott Betts et al.: The relationship between In-Process Quality Metrics & Computational Tomography; Sigma Labs; Inc.; http://sigmalabsinc.com/wp-content/uploads/2019/02/TEP-CT-correlation Sigma-Labs-Quality-Assurance.pdf; 2019; 11pgs.
Will Dalrymple: Pooling information; published in the Aug. 2015 issue of Machinery magazine; http://www.machinery.co.uk/machinery-features/concept-laser-is-promising-additive-manufacturing-users-a-more-comprehensive-part-propertyanalysis-tool; 6pgs.
R J Dewhurst and Q Shan: Optical remote measurement of ultrasound; 1999 Meas. Sci. Technol. 10 R 139; https://iopscience.iop.org/article/10.1088/0957-0233/10/11/201/pdf; 31pgs.
Miguel Arevallilo Herráez et al.: Fast two-dimensional phase-unwrapping algorithm based on sorting by reliability following a noncontinuous path; Applied Optics vol. 41, Issue 35, pp. 7437-7444 (2002); http://proxy.osapublishing.org/ao/ViewMedia.cfm?uri=ao-41-35-7437&seq=0&guid=ae730940-b8f4-95c3-daf6-a7f931712fe1; 8pgs.
Volker, Carl: Monitoring system for the quality assessment in Additive Manufacturing; carl@t-zfp.de; http://www.impulsthermografie.de/QNDE2014-Proceeding_EN_V3.pdf; 6pgs.
Lawrence Livermore National Laboratory: Real-time Melt Pool Sensor; https://manufacturing.llnl.gov/additive-manufacturing/accelerated-certification/real-time-melt-pool-sensor; 2pgs.
Günter Zenzinger et al.: Online-Prozesskontrolle bei der additiven Fertigung mittels Laserstrahlschmelzen; ZfP-Zeitung 140; http://www.t-zfp.de/Prufgerate/Fachbeitrag-MTU.pdf; 4pgs.
Mitsuo Takeda et al.: Fourier-transform method of fringe-pattern analysis for computer-based topography and interferometry; Journal of the Optical Society of America vol. 72, p. 156ff (1982); https://www.osapublishing.org/josa/abstract.cfm?uri=josa-72-1-156; 1981; 5pgs.
International Search Report and Written Opinion for PCT Application No. PCT/EP2019/060360; dated Dec. 8, 2019; 11 pages.

* cited by examiner

ADAPTIVE CLOSED-LOOP CONTROL OF ADDITIVE MANUFACTURING FOR PRODUCING A WORKPIECE

CROSS-REFERENCE TO RELATED APPLICATIONS

This application is a continuation of PCT International Application No. PCT/EP2019/060360 filed Apr. 23, 2019, which claims the benefit of U.S. Provisional Application No. 62/661,614 filed Apr. 23, 2018 and U.S. Provisional Application No. 62/661,616 filed Apr. 23, 2018. The entire disclosures of the applications referenced above are incorporated by reference.

FIELD

The present disclosure relates to additive manufacturing and more particularly to closed-loop control of additive manufacturing processes and machines.

BACKGROUND

The present invention relates to a method and an arrangement for producing a workpiece by using additive manufacturing techniques. More particularly, the invention relates to a method and an arrangement for producing a workpiece by applying defined material layers step by step and one on top of the other.

Traditional manufacturing techniques are often based on removing material from a block of material by cutting, milling, drilling, grinding or other abrasive processes. These traditional manufacturing methods may be called subtractive manufacturing, because removal of the material is the core production step in the process.

The traditional subtractive manufacturing techniques offer a variety of capabilities which can nowadays be carried out at a high level of precision. The range of shapes that can be produced, however, is limited by the access of the abrasive tools to designed features. Other production techniques involve injection molding, casting and similar processes that use a mold where a workpiece is formed. These production processes can be very cost-efficient for high volume products, but they are often too expensive if only a small number of parts is required. In addition, the range of shapes that can be produced is again limited due to restrictions of the mold.

Therefore, additive manufacturing techniques have gained increasing interest not only for the manufacture of prototypes, but also as a promising new manufacturing technology in general. A variety of additive manufacturing techniques have been proposed including but not limited to Selective Laser Sintering, Selective Laser Melting, Fused Deposition Modeling and Stereolithography. These methods typically use heat or other sources of energy in order to selectively bind material particles thereby forming a material layer of the workpiece. After the production process, the workpiece is cooled down or will automatically cool down to ambient temperature. The temperature variations may lead to internal stress, tensions, warping caused thereby and/or shrinking with the result that it is very difficult to achieve manufacturing tolerances as they are known from today's subtractive manufacturing techniques. Potential in-processing variations might add and make it even more difficult to produce a workpiece that conforms to a pre-defined design within small tolerances.

SUMMARY

In view of the above, it is an object to provide an improved method and an improved arrangement that facilitate a cost-efficient production of workpieces by using additive manufacturing techniques.

It is another object to provide a method and an arrangement that allow for an industrial production of workpieces using additive manufacturing techniques.

It is yet another object to improve additive manufacturing techniques, such that the workpieces produced meet high industry standards in terms of product quality and cost efficiency.

In order to achieve one or more of the aforementioned objects, there are provided methods and arrangements as disclosed in this specification and, moreover, as defined by the appended claims.

Accordingly, the new methods and arrangement may involve pre-process, in-process and post-process measurements in order to control the production process in a closed loop manner using current measurement results and using measurement results from earlier production processes collected and correlated in a production database. The methods and arrangement may involve an online adaptation of pre-defined layer definitions during the production process and in response to measurement results derived from at least one material layer produced in the course of just the production process. The online adaptation makes it possible to optimize the layer structure in a self-correcting manner in the course of the production process. Measurement results taken from a material layer just produced might therefore influence production parameters of subsequent layers, which are applied on top of the material layer just produced. In some preferred embodiments, each material layer produced by the layer tool is measured before the next material layer is produced and the production parameters of such next material layer depend on the measurement results of one or more preceding material layers. In other preferred embodiments, only a selected number of material layers from the plurality of material layers are measured during the production process. The selection of material layers to be measured might depend on dimensional characteristics of the workpiece to be produced in some embodiments. For example, material layers might be selected for an in-process measurement, if the thickness of horizontal and/or vertical structures exceeds predefined thresholds. In these embodiments, measurements are taken whenever structures involving a large amount of material are built. In other embodiments, measurements might selectively be taken, when relatively thin or fragile structures are built. Alternatively or in addition, individual characteristics of the material intended to be used in the production process is measured and analyzed in order to determine the appropriate layer definitions for the production process. For instance, particle dimensions, particle homogeneity and/or particle purity may advantageously be measured and analyzed, if a particulate material is used in the production process. Particles of the particulate material may be melted using a laser or any other kind of energy source, and the afore-mentioned particle characteristics are found to have an effect on the workpiece. Taking individual particle characteristics into account in the production process leads to more predictable and repeatable results.

Post-process measurements are also advantageous for collecting data that facilitates to increase accuracy, reliability, repeatability and precision of the production process be feeding back any results into the production database. Moreover, the combination of pre-process measurement, in-process measurement and post-process measurement is advantageous and facilitates to ensure that a workpiece produced by the new methods fulfills any desired product characteristics.

Advantageously, one or more of the following metrology devices may be used for the pre-process measurements, in-process measurements and post-process measurements: a temperature radiation detector configured for detecting a temperature distribution on the defined material layer, a laser light reflection detector configured for detecting laser light reflected from the defined material layer, an ultrasound reflection detector configured for detecting ultrasound reflected from the defined material layer, a density detector configured for detecting a density distribution of the defined material layer, a plasma radiation detector configured for detecting plasma radiation emitted from the defined material layer, a light microscope, such as ZEISS Smartproof, ZEISS Axio Observer or ZEISS Smartzoom, a contact 3D scanning head, such as ZEISS VAST or ZEISS VAST XT, a non-contact 3D scanning head, such as an optical scanning head using light patterns in the visible and/or infrared spectrum, such as a ZEISS COMET or ZEISS T-SCAN, an x-ray computed tomography measuring machine, such as ZEISS Xradia Versa, ZEISS METROTOM or ZEISS VoluMax and a scanning electronic microscope, such as ZEISS EVO or ZEISS sigma, all available from the Carl Zeiss Group headquartered in Germany.

Advantageously, at least one of pores, micropores, cracks, inclusions, gain structure and layer delamination among the defined material layer and the further material layers are detected using the metrology devices.

The new methods and arrangement provide for an improved process control which advantageously allows for an increased accuracy and precision of all workpiece dimensions. For example, it is possible to correct for unexpected shrinkage and/or warping caused by thermal variations in the production process. Preferably, the measuring head is configured to provide 3D coordinates for selected measurement points on the material layer to be measured. Preferred measuring heads may comprise tactile probes, such as analog scanning probes or touch-trigger probes, optical image detectors exploiting triangulation and/or focusing methods, optical image detectors exploiting deflectometric image analysis, inductive or capacitive distance sensors, and/or tomographical metrology detectors. Appropriate measuring heads have been widely used in the field of post process quality inspection using conventional coordinate measuring machines and, accordingly, preferred embodiments of the invention involve the integration of coordinate measuring technology from coordinate measuring machines into additive manufacturing machines, or vice versa.

In addition to the increased accuracy and reproducibility, the new methods and arrangement provide measurement results that advantageously characterize structures that cannot easily be accessed after the production process is completed. In particular, various cross sections and internal dimensions of the workpiece can be determined from the measurement results in a manner that was not possible heretofore.

According to some advantageous aspects, a method of manufacturing a product may comprise: obtaining a machine-readable description of the product, wherein the description includes a series of definitions, each definition defining a corresponding layer of the product; and creating a series of layers according to the series of definitions, in order, wherein creating a selected layer of the series of layers includes: obtaining a three-dimensional measurement of a prior layer deposited immediately prior to the selected layer; determining a deviation between the three-dimensional measurement of the prior layer and the definition of the prior layer; determining an adjustment to counteract the deviation; creating an adjusted definition for the selected layer based on the adjustment; and creating the selected layer based on the adjusted definition. Creating the selected layer based on the adjusted definition may include: distributing a powder across the prior layer; and applying a heat source to the powder according to the adjusted definition. Applying the heat source may include: applying the heat source to a specific location according to the adjusted definition; measuring a value indicative of strength of the heat source; and based on the measurement, adjusting a power applied by the heat source to other locations specified by the adjusted definition. Creating the selected layer based on the adjusted definition may include: distributing a powder across the prior layer; measuring characteristics the powder; and, in response to the measurement indicating uneven distribution of the powder, redistributing powder across the prior layer; and applying a heat source to the powder according to the adjusted definition.

The powder may be seen as the building block of some additively manufactured parts. Size distribution of individual powder particles influences how the powder is compacted and affects the density of the build and possibility of defects visible later in the process. Light microscopy (LM), scanning electron microscope (SEM) and/or X-ray or optical computer tomography (CT) may advantageously help to define the powder quality. The quality of powder and how it is spread during the build process might cause voids or material impurity to form in the structure. Inspecting the quality of the build with LM or internal structures with high-resolution X-ray CT helps to determine process parameters influence and faster define a possible path to achieve optimal settings. The additive manufacturing process, unlike classic manufacturing methods, requires powders to be melted during the build. Melt temperatures and process parameters greatly affect the crystallographic composition and, as a consequence, part properties. Successful build often requires various post-processing treatments to ensure dimensional accuracy and optimal material properties. After printing, the part is still attached to the build plate. It may then heat-treated and removed with wire EDM. To better understand the influence of those processes on final quality, a 3D contact or optical 3D scanner can advantageously be used. Collection and analysis of data across the entire process chain with various metrology devices including those ones mentioned above provides a deep understanding of how process changes might correlate with different dimensional and material properties. Clear visual representation and correlation of results across all process steps help to quickly and more efficiently develop printing strategies while increasing yield.

In a refinement, the step of producing a material layer therefore comprises heating a process material up to a defined process temperature which is higher than an ambient temperature, and said step of measuring the defined material layer is carried out after heating the process material and before the defined material layer has cooled down to ambient temperature.

In this refinement, measurements are taken before the defined material layer has adopted its final characteristics. In some preferred embodiments, the defined material layer is repeatedly measured before the subsequent material layer is applied, such that changes of the defined material layer as a function of the decreasing temperature can be recorded and corrected for, if appropriate. Moreover, the measurement results may advantageously be evaluated in order to optimize the production process. Therefore, this refinement contributes to an even higher accuracy and reproducibility of workpieces produced by the additive manufacturing techniques.

In a further refinement, the step of producing a material layer comprises heating a process material up to a defined process temperature which is higher than an ambient temperature, and said step of measuring the defined material layer is carried out before the process material is heated up to the defined process temperature.

According to this refinement, a measurement step already takes place before the defined material layer is actually produced. This refinement is particularly advantageous, if the material layer is produced from a powder bed and the individual characteristics of the powder bed are measured before the powder material is selectively heated up to the defined process temperature. In some preferred embodiments, measurements are taken both prior to and after selectively heating the process material up to the defined process temperature. These refinements allow for a close in-process control of flatness and/or homogeneity of the powder bed. Any flaws in the creation of the powder bed, which might have a negative impact on the accuracy of the workpiece, can be immediately corrected for. The number of defective parts can thus be considerably decreased.

In a further refinement, the step of measuring the defined material layer is carried out while the defined material layer is supported on the platform.

This refinement provides a true in situ measurement of the workpiece layer without removing the workpiece from the build platform. This refinement is advantageous, because the measurement results are highly representative for the characteristics of the defined material layer prior to applying the subsequent layer. Therefore, this refinement exploits the advantages of the new integrated measurement and production system in a very beneficial manner.

In a further refinement, the step of measuring the defined material layer comprises determining at least one of geometrical and dimensional characteristics of the defined material layer. Preferably, at least one of thickness, flatness, roughness and compliance with predefined nominal lateral dimensions of the material layer are determined.

According to this refinement, geometrical and/or dimensional characteristics of the workpiece are directly monitored during the additive manufacturing process. Since geometrical and dimensional characteristics are very often critical for workpiece quality, it is highly advantageous to control these parameters online during the production process.

According to a further refinement, the step of measuring the defined material layer comprises determining at least one of a density and a temperature distribution of the defined material layer.

Temperature distribution and density of the material are parameters that might indirectly influence the accuracy of the workpiece after the production process is completed. Especially the temperature distribution in the defined material layer provides valuable information in order to control warping and/or internal stress, which might build up during the cooling process. A closed loop control of the temperature distribution and/or density is therefore beneficial in order to achieve a high product quality and reproducibility.

In a further refinement, the step of measuring is repeated for the further material layers in order to determine further individual characteristics, and the further individual characteristics are used in a closed loop configuration until a final material layer of the workpiece has been produced.

This refinement provides for a continuous in-process control of the production process not only for one material layer, but for the plurality of layers. In addition, this refinement automatically leads to a number of measurement results that allow to calculate various true cross sections. Accordingly, individual internal structures of the workpiece can be advantageously assessed.

In a further refinement, a production database is provided, which production database represents a nominal relationship between the predefined layer definitions, the layer tool and the material layers produced by the layer tool, wherein the production database is used in the step of controlling the layer tool in accordance with the defined layer definition, and wherein the production database is repeatedly updated in response to the individual characteristics as measured by the at least one from the plurality of metrology devices in order to establish a self-learning database fed by a plurality of in-process measurement results, and wherein the layer tool is controlled using the production database including any of its updates.

This refinement establishes a self-learning database that is fed by the plurality of in-process measurement results. In turn, the database may advantageously be used for the control of the production process. The refinement allows for even higher product quality, because each production process provides updated feedback for the next production process. Systematic flaws in the production process can quickly be eliminated and individual machine characteristics can be accounted for.

In a further refinement, the workpiece is measured after removal from the build platform in order to determine final workpiece characteristics, wherein the production database is updated in response to the final workpiece characteristics.

This refinement includes the individual characteristics of the final workpiece in the feedback loop that advantageously enhances product quality. Interdependencies between process parameters and final product characteristics are exploited in some sort of continuing improvement process.

In a further refinement, the workpiece is finally measured after all layers of the plurality of layers are produced in order to verify conformance of the workpiece with the CAD data set.

According to this refinement, an additional measurement is carried out after the production process is completed. In some embodiments, the additional measurement is carried out on a separate coordinate measuring machine, which means that a conventional quality inspection is carried out in addition to the new in-process quality control. In other embodiments, the additional measurement is carried out in situ, but after the workpiece has substantially or even completely cooled down to ambient temperature. Advantageously, the measurement results of this additional (final) measurement are also used for updating the production database mentioned above. This refinement makes clear, that the above-mentioned in-process measurements should not be confused with traditional after process quality control. Rather, it adds to such measurements in order to achieve an even higher accuracy.

In a further refinement, the step of producing further material layers comprises at least one of increasing an amount of process material relative to a nominal amount for filling voids in the defined material layer, decreasing an amount of process material relative to a nominal amount in order to correct for oversize dimensions of the defined material layer, modifying a movement parameter of the layer tool relative to the platform, and modifying a process temperature.

These refinements are directed to in-process reactions that exploit the measurement results in an advantageous manner. These refinements help to achieve a high product quality with a low rate of defective parts. Increasing or decreasing the amount of process material is an easy and efficient approach for in-process corrections in order to keep the workpiece within predefined specifications. Modifying movement parameters of the layer tool, such as movement trajectory, movement velocity or accelerations helps to optimize the production process for various parts having different characteristics. Modifying a process temperature likewise helps to optimize the production process. Advantageously, the modification of movement parameters or process temperatures is made using the production database mentioned above.

In a further refinement, the step of producing further material layers comprises a step of ablating excess material from the defined material layer using a subtractive manufacturing technique.

In this refinement, the additive manufacturing technique is complemented by an in-process abrasive correction, for example by grinding and/or milling, in order to correct for undesired excess material. This refinement also helps to keep the workpiece within predefined specifications.

In a further refinement, the step of producing further material layers is aborted if the individual characteristics of said defined material layer exceed a predefined threshold level.

According to this refinement, the production process is terminated if the in-process measurement results indicate that the desired product specifications cannot be achieved. In contrast to existing additive manufacturing methods and arrangements, time-consuming and expensive production of defective parts is avoided.

In a further refinement, the measuring head comprises at least one of a tactile probe, an optical metrology sensor and a computer tomography detector. In preferred embodiments, the optical metrology sensor comprises a camera and associated image processing equipment that allow for a 3D coordinate measurement.

This refinement advantageously uses well-established and proved measurement technologies for the in-process quality control in the production process. Accordingly, the measurement results can easily be evaluated and used in existing quality control systems.

In a further refinement, the build platform comprises a distinct datum feature defining a reference point for the measuring head.

This refinement integrates the production platform into the in-process measurement system and, therefore, facilitates advantageous 3D coordinate measurements in situ. A distinct datum feature makes it possible to measure dimensional and/or geometrical characteristics of the material layers and the workpiece with respect to a reference point that is linked to the production site of the workpiece. Therefore, the production process can be monitored even closer.

In a further refinement, the layer tool comprises a source of energy producing an energy beam directed to the defined material layer, wherein at least one of a dimension and a form of an energy well formed in the defined material layer due to the energy beam and any material layers below is measured. The source of energy may be a laser emitter or an ultrasound emitter. The energy beam introduces heat into the material layer such that particles of a particulate material are melted together or a material layer is sintered. The energy heats the particulate material or material layer locally, but within a certain radius or extension. The energy may form a well of heated material and the vertical depth, horizontal dimension and the form of the well extension is a characteristic feature that is advantageously used in controlling the in a closed-loop manner.

It goes without saying that the features mentioned above and yet to be explained below can be used not only in the respectively cited combination, but also in other combinations or on their own without departing from the scope of the present invention.

BRIEF DESCRIPTION OF THE DRAWINGS

Example embodiments are illustrated in the drawing and will be explained in more detail in the description below. In the drawing.

DETAILED DESCRIPTION

Figure 1:
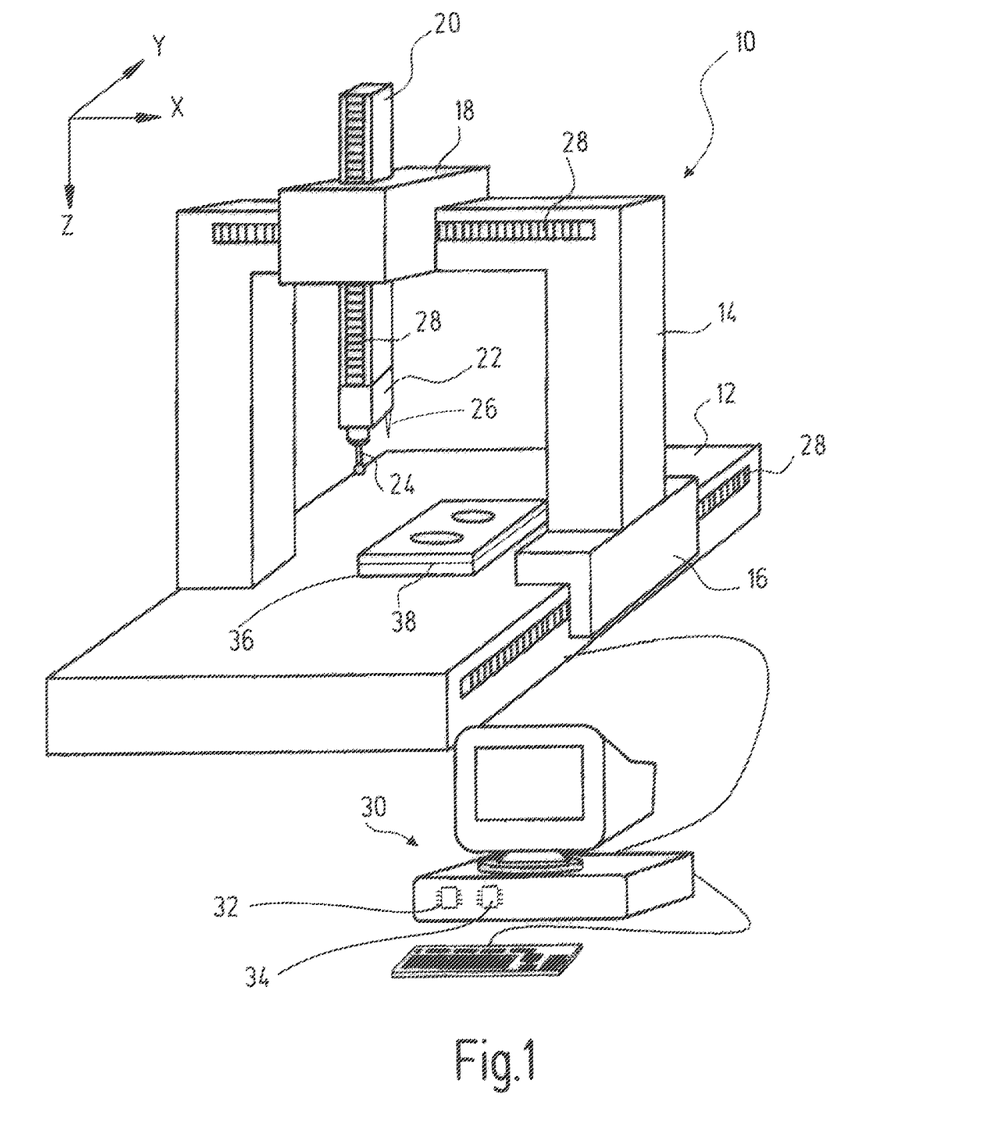
FIG. 1 shows an illustrative example of an integrated workpiece production and measuring machine.

In FIG. 1, an integrated production and measuring machine in accordance with an embodiment of the invention is designated by reference number 10 in its entirety. Machine 10 comprises a base 12, which is configured as a machine table in this embodiment. Table 12 may be used as a build platform in this embodiment. Other embodiments may involve build platforms that are separate from a machine base or table, such as tray-like platforms that can be handled by robots for feeding, conveying and unloading of workpieces in a multi-stage production arrangement.

In the present embodiment, a gantry 14 is moveably arranged on table 12. Gantry 14 comprises a foot 16 including an electrical drive for moving gantry 14 relative to table 12 in a linear direction, which is typically designated as Y-axis. Gantry 14 has a crossbar where a carriage 18 is moveably arranged. Carriage 18 can be moved relative to gantry 14 in a linear direction, which is typically designated as X-axis. One or more respective drives may be accommodated in carriage 18 or in the crossbar member of gantry 14 or in any other appropriate location.

Carriage 18 carries a quill 20 which is moveable in a third linear direction typically designated as Z-axis. Quill 20 carries a head 22, which may be a combined production and measuring head in accordance with some preferred embodiments. Head 22 here comprises a tactile measuring probe 24 and a layer tool 26 configured to produce material layers in order to produce a workpiece by additive manufacturing techniques. Layer tool 26 may be a powder jet combined with a heater for melting or sintering the powder material. The heater may comprise a laser. In other embodiments, layer tool 26 may comprise a laser for melting or sintering powder material arranged in a flat powder bed on platform 12. It should be appreciated that embodiments of the invention are not restricted to certain additive manufacturing techniques where a workpiece is built layer by layer. Therefore, FIG. 1 and the embodiments explained here are for illustrative purposes without a restriction to the details shown. Other embodiments may therefore comprise separate or additional tools, such as sliders for preparing a powder bed on platform 12. Moreover, measuring tool 24 may be a non-tactile probe and layer tool 26 may be separately arranged from measurement tool 24 in other embodiments of the invention.

In addition, it should be recognized that gantry-type machine 10 is also shown here by way of example. Other machine designs may also be appropriate.

In FIG. 1, reference number 28 designates various scales configured for determining a 3D position of head 22 within the working volume of the machine. Reference number 30 designates a control unit, which may be implemented using a programmable logic controller (PLC) and/or personal computer technology. By way of example, control unit 30 comprises a controller 32 configured for driving and operating layer tool 26 and measuring probe 24. In preferred embodiments, controller 32 might be implemented using a plurality of CPUs, and it may be configured for controlling layer tool 26 in a close-loop control using measurement data from probe 24. Reference number 34 designates a memory, such as a RAM, for storing CAD data representing the design of a workpiece to be built. Control unit 30 may comprise further memories (not shown), such as a non-volatile ROM, in order to store an operating system enabling control unit 30 to control layer tool 26 and probe 24 in accordance with CAD data from memory 34.

For illustrative purposes, a workpiece 36 is here arranged on platform 12. Workpiece 36 comprises a plurality of layers 38 which are formed one on top of the other (step-by-step) using layer tool 26 and using feedback representing individual characteristics of one or more of these layers from measurement probe 24.

Figure 2:
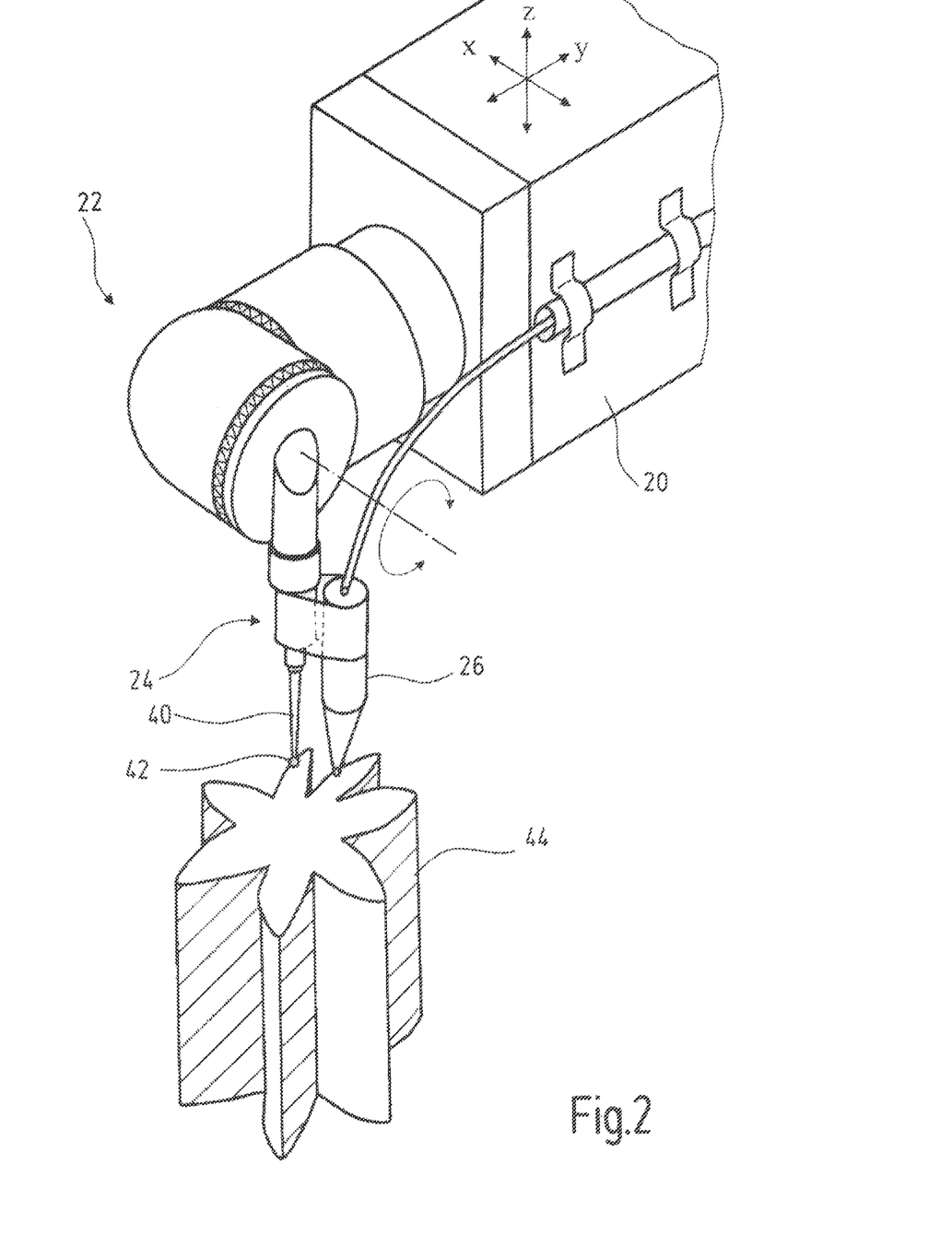
FIG. 2 shows an illustrative example of combined measurement and tool head for the machine of FIG. 1.

FIG. 2 illustrates some details of head 22. As can be seen, head 22 comprises a 2-axis rotary joint in this example embodiment. The rotary joint allows to rotate measurement probe 24 and layer tool 26 about two mutually orthogonal axes. Such rotary joint allows various orientations of measurement probe 24 and layer tool 26 in accordance with advantageous embodiments. As already indicated above, however, other machine designs including those without a rotary joint may be suitable for implementing the present invention.

As can further be seen, measuring probe 24 here comprises a stylus 40 having a ball tip 42 for contacting selected measurement points on a recently applied workpiece layer 44. Control unit 30 may control probe 24 in a scanning motion and/or in a single point (touch-trigger) measuring mode.

Other embodiments may comprises other types of measurement probes including optical 2D or 3D camera sensors (e.g. using laser triangulation and/or focussing), capacitive sensors, optical camera sensors using deflectometry or scatterometry, electron or particle beam sensors, or tomographical metrology sensors in addition or as an alternative to tactile measuring probe 24. In preferred embodiments, probe 24 is capable of providing precise 3D measurement data representing dimensional and/or geometrical characteristics of a respective topmost workpiece layer (indicated here by reference numeral 44). Further advantageous measurement technologies comprise temperature sensors, pressure sensors, shear sensors and/or color sensors in order to determine corresponding characteristics of the workpiece and/or the respective topmost material layers. In some embodiments, a temperature distribution of the topmost material layers is determined in order to correct for warping which may result from residual stress in the workpiece after the production process.

In some preferred embodiments, a material layer of the workpiece is not only measured after the material layer has been produced. Rather, it might be advantageous especially for powder bed machines to measure individual characteristics of the powder material before the powder material is melted or sintered using a laser, for instance. Optical metrology sensors are very suitable for these kinds of in-process measurements. In some embodiments, the measurement sensor may be attached to a slider configured for producing the powder bed prior to the melting or sintering step.

Figure 3:
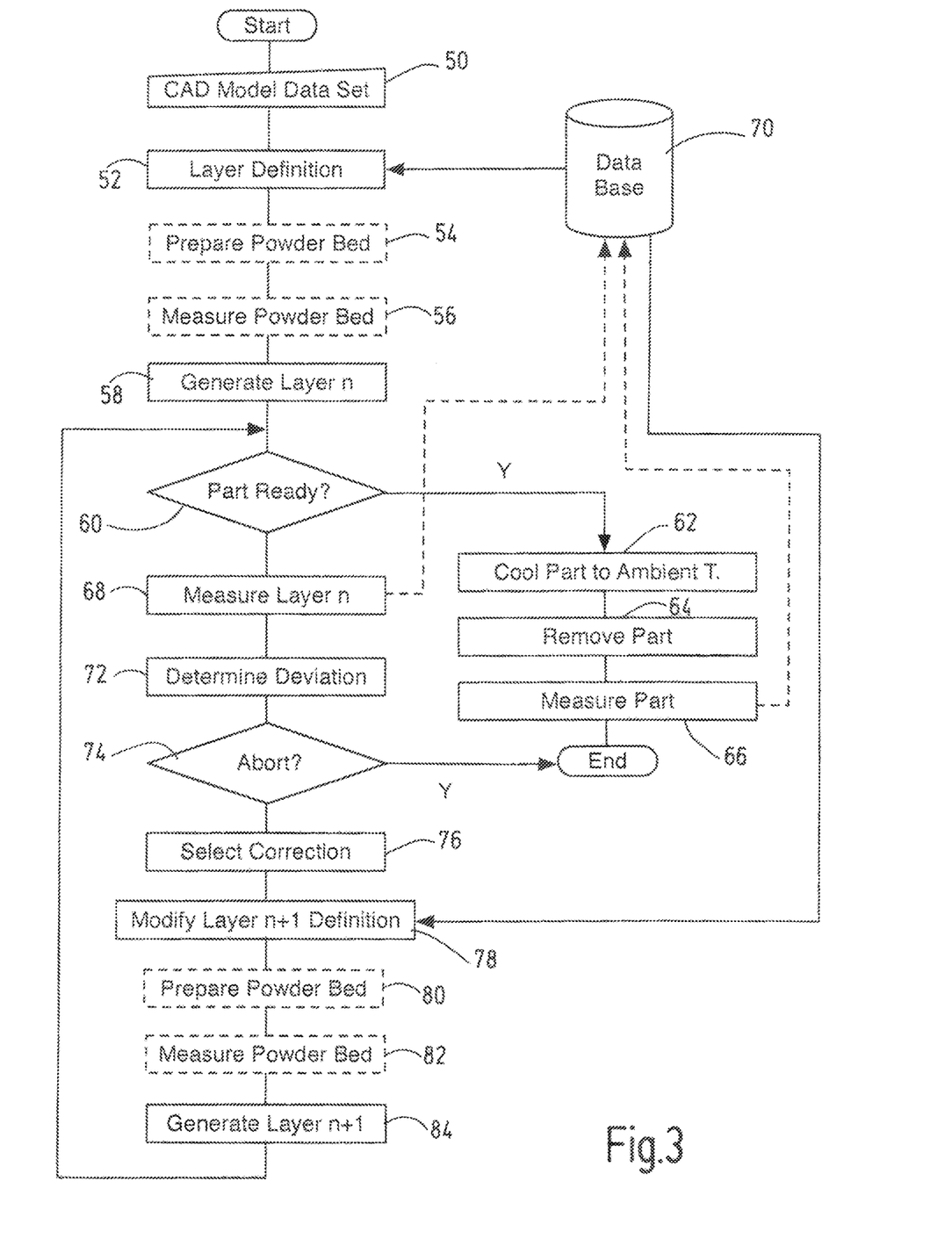
FIG. 3 shows a flow diagram illustrating preferred operating modes of the machine of FIG. 1.

FIG. 3 shows a flow chart in order to illustrate an example embodiment of the new method and a corresponding operating mode of machine 10. According to step 50, a CAD model dataset comprising CAD data of the desired workpiece is provided. The CAD dataset may be generated using conventional design tools. In preferred embodiments, the CAD data set is loaded into memory 34 of control unit 30, which subsequently controls machine operations in accordance with the CAD model dataset.

According to step 52, layer definitions for each workpiece layer are determined. This step might be carried out on or using control unit 30. In other embodiments, layer definitions may be determined separate from control unit 30 and loaded into an appropriate memory of control unit 30.

In some preferred embodiments, the method uses powder bed technology, where a flat bed of powder material is produced. A laser or some other energy source may then melt or sinter selected areas within the powder bed in order to produce a desired layer structure. Powder material that is not melted or sintered may be removed afterwards and prior to the next production step. Accordingly, some embodiments of the new method involve step 54, where a powder bed is prepared. Optional step 56 may comprise the measurement of individual characteristics of the powder material and/or the powder bed prior to generating the desired material layer by a melting or sintering step 58.

According to step 60, a determination is made whether or not the desired workpiece is completed. If in the affirmative, the workpiece may be cooled down to ambient temperature in accordance with step 62. The workpiece may be removed from platform 12 in accordance with step 64. The workpiece may then be measured using conventional coordinate measuring technology in accordance with step 66. It should be noted that the measurement according to step 66 typically takes place after the production process has been completed. In some preferred embodiments, measurement step 66 is carried out on a separate measuring machine, although it would also be feasible to use the combined measurement and production machine 10.

If it is determined in step 60 that the workpiece production process is completed, recently produced workpiece layer n is measured in accordance with step 68. The measurement results may be used to update a production database 70. Advantageously, production database 70 is used for determining the layer definitions in accordance with step 52. In particular, measurement results from step 68 may be used in order to optimize layer definitions already at the beginning of the production process, because the measurement results from step 68 provide a valuable feedback about the layer generation step 58.

According to step 72, any deviations between the desired layer characteristics represented by the layer definitions and the real layer characteristics represented by the measurement results from step 68 are determined. In some preferred embodiments, the production process is aborted according to step 74, if it is determined that the measured layer characteristics deviate from the desired definitions to such an extent that no correction in the further course of the production process seems possible. If, however, a correction of detected deviations seems possible, an appropriate correction may be selected in accordance with step 76. Appropriate correction may comprise at least one of increasing an amount of process material for the subsequent layer at selective locations thereby increasing the thickness of the subsequent layer at the selective locations. If appropriate, the amount of process material for the subsequent layer may locally or generally be decreased in order to correct for oversize dimensions of the layer measured in step 68. It is also feasible that the "subsequent layer" is a pure correction layer for correction of the measured layer, i.e. the defective layer is processed again. Movement parameters of the layer tool including velocity and/or trajectory may be modified and/or process temperatures for the subsequent layer generation may be changed in accordance with the results from the measurement step 68.

Therefore, step 78 generally involves modification of subsequent layer definitions. Again, knowledge from database 70 might advantageously be used. In preferred embodiments, the modification of layer definitions including modification of movement parameters, process temperatures etc. may only be used at selected locations of the subsequent workpiece layer, if appropriate.

Subsequent steps 80, 82, 84 correspond to steps 54, 56, 58 already explained above. Accordingly, a next workpiece layer n+1 is generated and the method loops back to step 60 in order to determine if all predefined workpiece layers have been produced.

As can be seen from FIG. 3, preferred embodiments comprise a real-time in-process measurement of individual characteristics of recently generated workpiece layers as well as an in-process feedback of the measurement results into the production process for the build of subsequent workpiece layers or portions of workpiece layers. Advantageously, a self-learning database is fed with the in-process measurement results in order to optimize the production process on a long term basis. Additional after-process measurement may also be used to feed and update a production database.

Figures 4, 5:
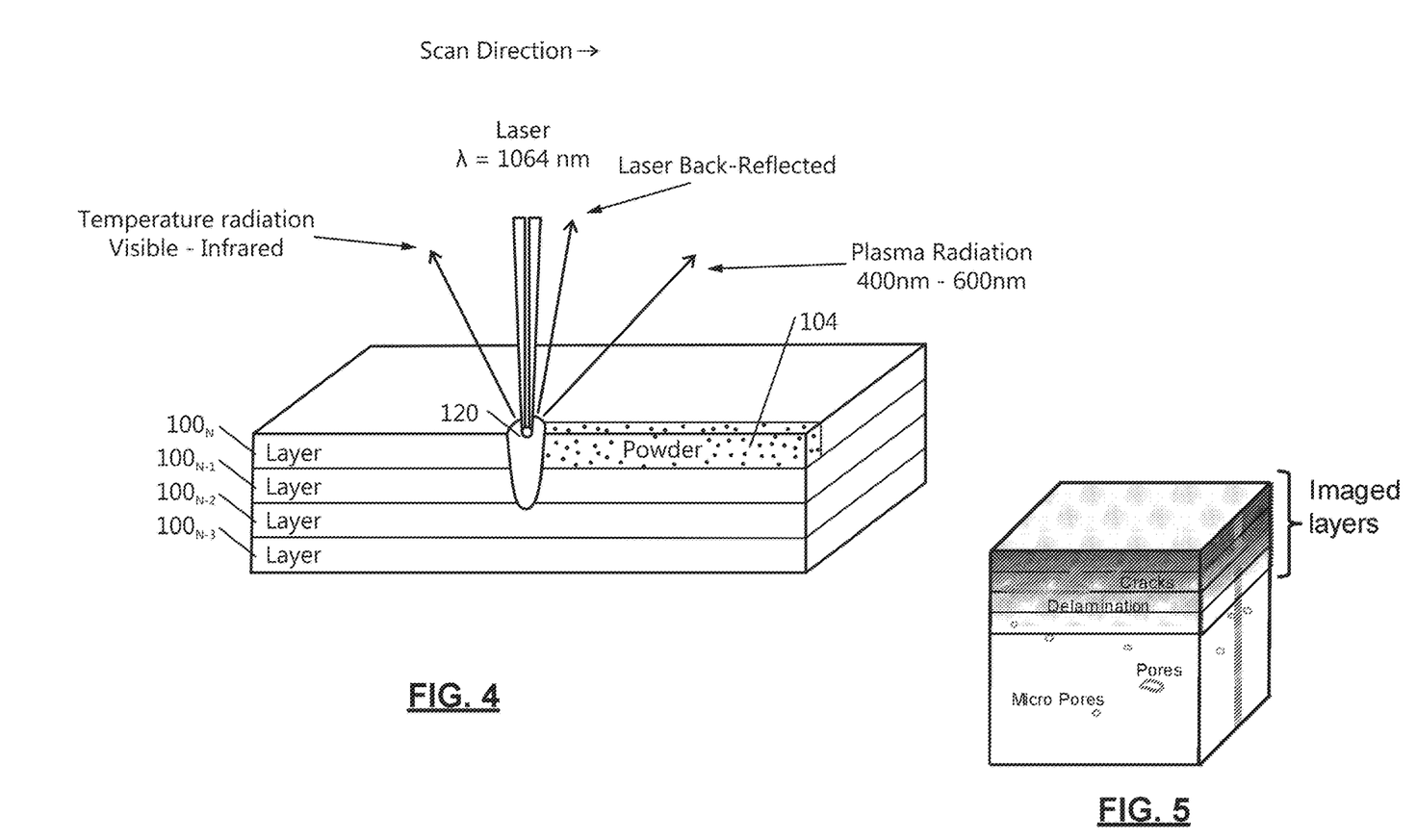
FIG. 4 shows an illustrative example of a measurement in connection with a laser heat source being applied to a powder bed.
FIG. 5 shows an illustrative example of potential defects, such as pores, cracks, and delamination between the layers.

In FIG. 4, formation of layer N ($100_N$) is shown schematically by a laser heat source being applied to a powder bed 104. The powder bed 104 was spread across layer $100_{N-1}$ before application of the laser heat source. In turn, layer $100_{N-1}$ had been formed on top of layer $100_{N-2}$, which had been formed on top of layer $100_{N-3}$. Note that the laser creates a melt pool 120 that is not constrained to the powder 104. In fact, the melt pool 120 in the displayed example extends to layer $100_{N-2}$. This heating of existing layers can contribute to manufacturing defects, such as pores, cracks, and delamination between the layers 100, as depicted in FIG. 5.

For a certain manufacturing process, a certain size of melt pool may be desirable. The size may be defined both in circumference and depth. The size may vary, even within the same manufacturing process, based on measurements of the powder that will be used, either before manufacturing of the workpiece begins or between layers. The power of the laser may be varied by a control module in real-time using closed-loop feedback to control the size of the melt pool 120 to the desired size.

The size of the melt pool 120 may be measured based on temperature radiation, which may vary from the visible spectrum to the infrared spectrum, or by plasma radiation. Further, the power of the laser may be measured based on back-reflections, and the size of the melt pool 120 estimated based on the power of the laser.

For a given target position of the laser, the size of the melt pool 120 may be measured surrounding that target position based on how the temperature falls away from the center of the target position where the heat is the highest. For example, at 360 degrees around a circle with the origin at the center of the radiation, the distance from the center at which the heat falls to a certain level may be measured. The certain level may be a predefined level or may be defined as a predetermined percentage of the temperature at the center of the target position. A best fit circle can then be calculated from the distances around the circle and the diameter of the circle may be used as the size of the melt pool 120.

The depth of the melt pool 120 may not be directly measurable. However, the rate at which the temperature decays once the laser moves away from the melt pool 120 may be indicative of how much latent heat the melt pool 120 absorbed and, knowing the diameter of the melt pool 120, the depth can be estimated. When the diameter and/or depth of the melt pool 120 exceeds the process guidelines for the manufacturing process, the power of the laser may be decreased. For example, a proportional-integral-derivative controller may be used for closed-loop control of the laser power.

Prior to forming the layer $100_N$ using the laser, a system according to the present disclosure may measure the powder bed (the powder 104 is the remaining portion of the powder bed). For example, the smoothness of the powder bed may be measured. Variations in smoothness may cause the powder bed to be reapplied. For example, a scraper blade may scrape off the distributed powder bed into a discard area and a new powder bed distributed across the layer $100_{N-1}$. In some implementations, if a second distribution still does not result in an even powder bed, an error may be flagged. As one example, a scraper blade responsible for distributing the powder may have an imperfection that needs to be manually removed by an operator; as another example, the quality of the powder may be problematic and the powder needs to be changed out.

In various implementations, the definition of layer $100_N$ may be adjusted to account for imperfections in the powder bed. For example, in an area where the powder bed is thin, the laser may be run at reduced power (or the laser may dwell for less time) to avoid heating more than the thin powder bed. This approach may work when a small reduction in one layer's thickness may be offset by mitigated by the next layer but over-heating layers below the thin powder creates manufacturing defects.

As demonstrated by FIG. 4, forming a layer can affect other layers and so multiple layers may need to be imaged in order to assess manufacturing quality. See FIG. 5, which depicts imaging four layers as one example. This multi-layer imaging may be performed once the workpiece is completed, or may be performed after each layer or after each set of layers. For example, if 10 layers are imaged at a time, the 10-layer imaging may be performed after each layer, after each 5 layers, or after each 10 layers. Performing the 10-layer imaging less frequently than every 10 layers may lead to some problems escaping notice.

Based on the imaging, adaptations to the definitions of later layers may be made. For example only, prior problems may be avoided by adjusting powers, timings, or paths. For example, paths of the laser may be separated by a certain distance to avoid excessive indirect heating. In some implementations, correction of layers may be attempted by the laser. For example, a micro-pore may be addressed by creating a melt pool that encompasses the micro-pore with the assumption that material will re-flow and fill the micro-pore.

Figure 6:
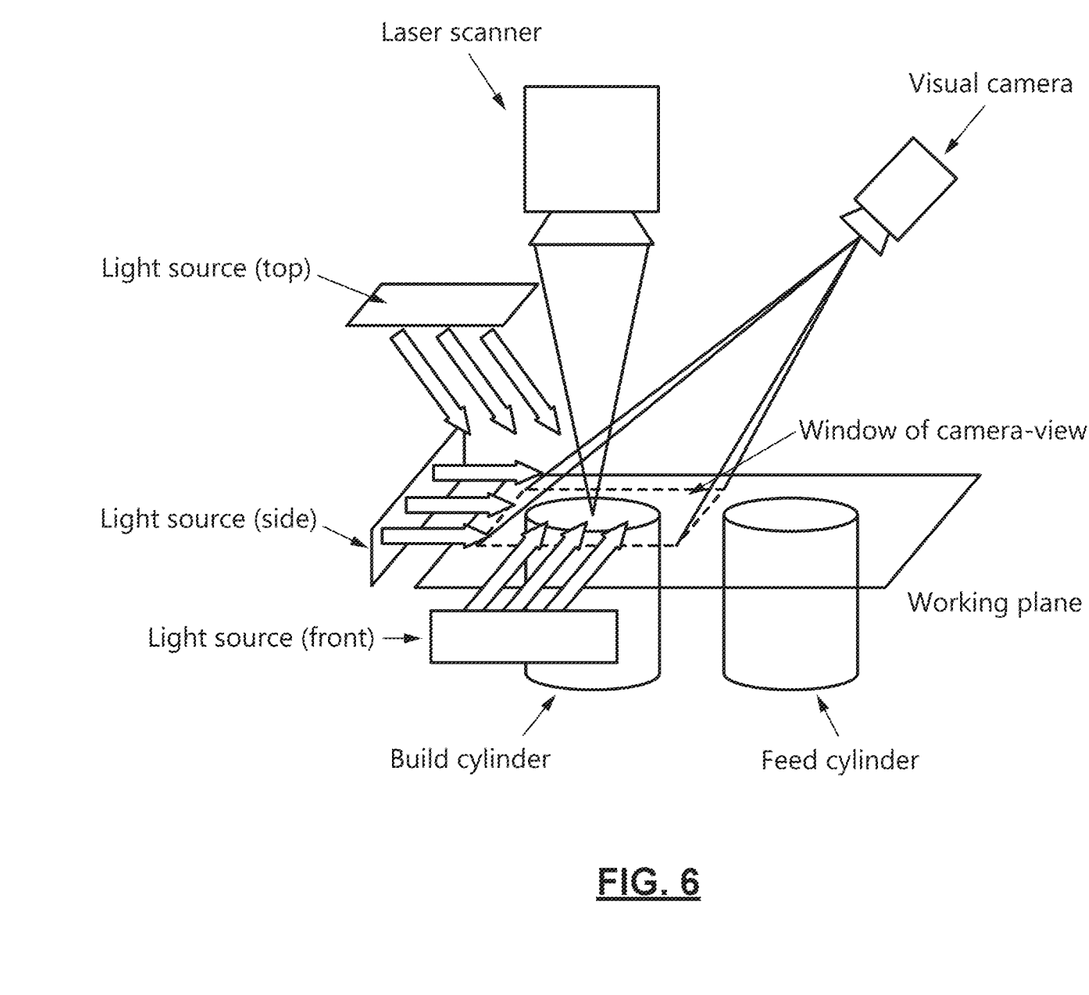
FIG. 6 shows an illustrative example of a visual camera and three orthogonal light sources used to illuminate a workpiece.

FIG. 6 shows one example of a visual camera and three orthogonal light sources used to illuminate a workpiece. The camera may obtain an image of a distributed powder bed and the image is analyzed to assess evenness of the powder bed. As discussed above, unevenness in the powder bed may result in the powder bed being redistributed. If multiple redistributions are necessary within a certain number of layers, an error may be flagged for operator attention.

The camera may also assess each layer of the workpiece as the workpiece is being formed. In some implementations, if the workpiece differs too dramatically from specification, and adjustments to future layers will not be sufficient to correct the workpiece, the workpiece may be declared to be scrap.

In some implementations, the camera is only used to assess powder bed uniformity, while another sensor or set of sensors is used to measure the workpiece. For example, x-ray or ultrasonic sensors may be able to identify internal defects of the workpiece not visible to the camera.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean at least one of A, at least one of B, and at least one of C." The same applies to the phrase at least one of A, B, or C.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4. The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

What is claimed is:

1. A method of producing a workpiece by using additive manufacturing techniques, the method comprising:
    Obtaining a computer-aided design (CAD) data set representing the workpiece in a plurality of workpiece layers, wherein the CAD data set includes a plurality of layer definitions corresponding to the plurality of workpiece layers;
    Producing a defined material layer of a particulate material on a build platform;
    Measuring the defined material layer, prior to selective solidification of the defined material layer of particulate material, using a first metrology device from a plurality of metrology devices in order to determine individual characteristics of the defined material layer;
    Controlling a layer tool in accordance with a layer definition rom the plurality of layer definitions in order to produce a defined workpiece layer within the defined material layer by selectively solidifying the particulate material of the defined material layer; and
    Subsequent to selective solidification of the defined material layer of particulate material, successively producing, on the defined workpiece layer (i) further defined material layers and (ii) by controlling the layer tool in according with further layer definitions of the plurality of layer definitions, further defined workpiece layers from the further defined material layers,
    Wherein the further definitions are generated from the plurality of layer definitions as a function of both the previously measured individual characteristics of the defined material layer and the previously measured individual characteristics of the defined workpiece layer,
    Wherein the first metrology device includes at least one of a non-contact 3D sensor, a contact 3D scanning head, and a surface roughness sensor, and
    Wherein the second metrology device includes at least one of a temperature radiation detector configured to detect a temperature distribution on the defined material layer, a laser light reflection detector configured to detect laser light reflected from the defined material layer, a density detector configured to detect a density distribution of the defined material layer, and a plasma radiation detector configured to detect plasma radiation emitted from the defined material layer.

2. The method of claim 1, wherein:
    the first metrology device includes the non-contact 3D sensor; and
    the non-contact 3D sensor is an optical 3D sensor.

3. The method of claim 1, wherein:
    the selectively solidifying the particulate material comprises selectively heating the particulate material provided in a powder bed on the build platform up to a defined process temperature;
    the defined process temperature is higher than an ambient temperature; and
    the measuring the defined workpiece layer is carried out while or after heating the particulate material and before the defined workpiece layer has cooled down to the ambient temperature.

4. The method of claim 1, wherein:
    the selectively solidifying the particulate material comprises heating the particulate material up to a defined process temperature;
    the defined process temperature is higher than an ambient temperature; and
    the measuring the defined material layer is carried out before the particulate material has reached the defined process temperature.

5. The method of claim 1, wherein the measuring the defined material layer is carried out while the defined material layer is supported on the build platform.

6. The method of claim 1, wherein the measuring the defined material layer comprises determining geometrical characteristics of the defined material layer including at least one of flatness of the defined material layer, dimensional characteristics of the defined material layer, and roughness of the defined material layer.

7. The method of claim 1, further comprising:
    repeating the measuring for multiple of the further material layers in order to determine further individual characteristics,
    wherein the further individual characteristics are used in a closed loop configuration until a final material layer of the workpiece has been produced.

8. The method of claim 1, further comprising:
    Providing a production database that represents a nominal relationship between the plurality of layer definitions, the layer tool, and the defined workpiece layers produced by the layer tool; and
    Repeatedly updating the production database in response to the individual characteristics as measured by the plurality of metrology devices in order to establish a self-learning database fed by a plurality of in-process measurement results, wherein the layer tool is controlled using the production database as updated.

9. The method of claim 8, further comprising:
    Measuring the workpiece after removal from the build platform in order to determine final workpiece characteristics; and
    And updating the nominal relationship between the plurality of layer definitions, the layer tool, and the defined workpiece layers produced by the layer tool in response to the final workpiece characteristics.

10. The method of claim 9, wherein:
    the measuring the workpiece after removal from the build platform is performed using a third metrology device of the plurality of metrology devices; and
    the third metrology device includes at least one of a contact 3D scanning head, a non-contact 3D scanning head, an x-ray computed tomography measuring machine, a scanning electronic microscope, and a light microscope.

11. The method of claim 10, further comprising:
    Updating the nominal relationship between the plurality of layer definitions, the layer tool, and the defined workpiece layers produced by the layer tool in response to measurement results generated using the third metrology device.

12. The method of claim 8, wherein:
- the producing the defined material layer comprises distributing the particulate material on at least one of the build platform and a previously produced material layer;
- specific material characteristics of the particulate material are determined using a fourth metrology device of the plurality of metrology devices; and
- the specific material characteristics are supplied into the production database in order to refine the nominal relationship.

13. The method of claim 12, wherein the fourth metrology device includes at least one of a light microscope, a scanning electron microscope, and an x-ray computed tomography machine.

14. The method of claim 12, wherein the specific material characteristics are determined prior to the distributing the particulate material.

15. The method of claim 12, wherein the specific material characteristics represent at least one of individual particle size, average particle size, particle homogeneity, particle size distribution, particle aspect ratio, particle density, and particle purity.

16. The method of claim 12, wherein the particulate material is selected from the group consisting essentially of polystyrene, polypropylene, polyamide, polyurethane, polyester, PEEK, aluminum alloys, Co—Cr alloys, nickel alloys, gold, silver, stainless steel, titanium, Ti-6Al-4V, and tool steel.

17. The method of claim 1, wherein the workpiece is measured using the metrology devices in a manner so as to detect or identify at least one of pores, micropores, cracks, inclusions, grain structure, and layer delamination among the defined workpiece layer and the further defined workpiece layers.

18. The method of claim 1, wherein the producing the further material layers comprises at least one of:
- increasing an amount of particulate material relative to a nominal amount for filling voids in the defined workpiece layer;
- decreasing an amount of particulate material relative to the nominal amount in order to correct for oversize dimensions of the defined workpiece layer;
- modifying a movement parameter of the layer tool relative to the build platform;
- modifying output power of the layer tool; and
- modifying a process temperature.

19. The method of claim 1, wherein the producing the further material layers includes ablating excess material from the defined workpiece layer using a subtractive manufacturing technique.

20. The method of claim 1, further comprising measuring at least one of a dimension and a shape of an energy well formed in the defined material layer and any further defined material layers below resulting from an energy bream produced by the layer tool.

* * * * *

UNITED STATES PATENT AND TRADEMARK OFFICE
CERTIFICATE OF CORRECTION

PATENT NO. : 11,975,481 B2
APPLICATION NO. : 17/078604
DATED : May 7, 2024
INVENTOR(S) : Marcin B. Bauza et al.

It is certified that error appears in the above-identified patent and that said Letters Patent is hereby corrected as shown below:

In the Claims

Claim 1, Column 15, Line 17    "Obtaining" should be --obtaining--

Claim 1, Column 15, Line 22    "Producing" should be --producing--

Claim 1, Column 15, Line 24    "Measuring" should be --measuring--

Claim 1, Column 15, Line 29    "Controlling" should be --controlling--

Claim 1, Column 15, Line 30    "rom" should be --from--

Claim 1, Column 15, Line 33    After "layer;" insert --¶ measuring the defined workpiece layer, subsequent to selective solidification of the defined material layer of particulate material, using a second metrology device from the plurality of metrology devices in order to determine individual characteristics of the defined workpiece layer;--

Claim 1, Column 15, Line 34    "Subsequent" should be --subsequent--

Claim 1, Column 15, Line 38    "according" should be --accordance--

Claim 1, Column 15, Line 41    "Wherein" should be --wherein--

Claim 1, Column 15, Line 41    "further definitions" should be --further layer definitions--

Claim 1, Column 15, Line 47    "Wherein" should be --wherein--

Claim 1, Column 15, Line 50    "Wherein" should be --wherein--

Claim 8. Column 16. Line 35    "Providing" should be --providing--

Signed and Sealed this
Tenth Day of September, 2024

Katherine Kelly Vidal
*Director of the United States Patent and Trademark Office*

CERTIFICATE OF CORRECTION (continued)
U.S. Pat. No. 11,975,481 B2

Claim 8, Column 16, Line 39    "Repeatedly" should be --repeatedly--

Claim 8, Column 16, Line 43    after "results," insert --¶--

Claim 9, Column 16, Line 46    "Measuring" should be --measuring--

Claim 9, Column 16, Line 49    "And updating" should be --updating--

Claim 11, Column 16, Line 63   "Updating" should be --updating--